Patented Dec. 15, 1925.

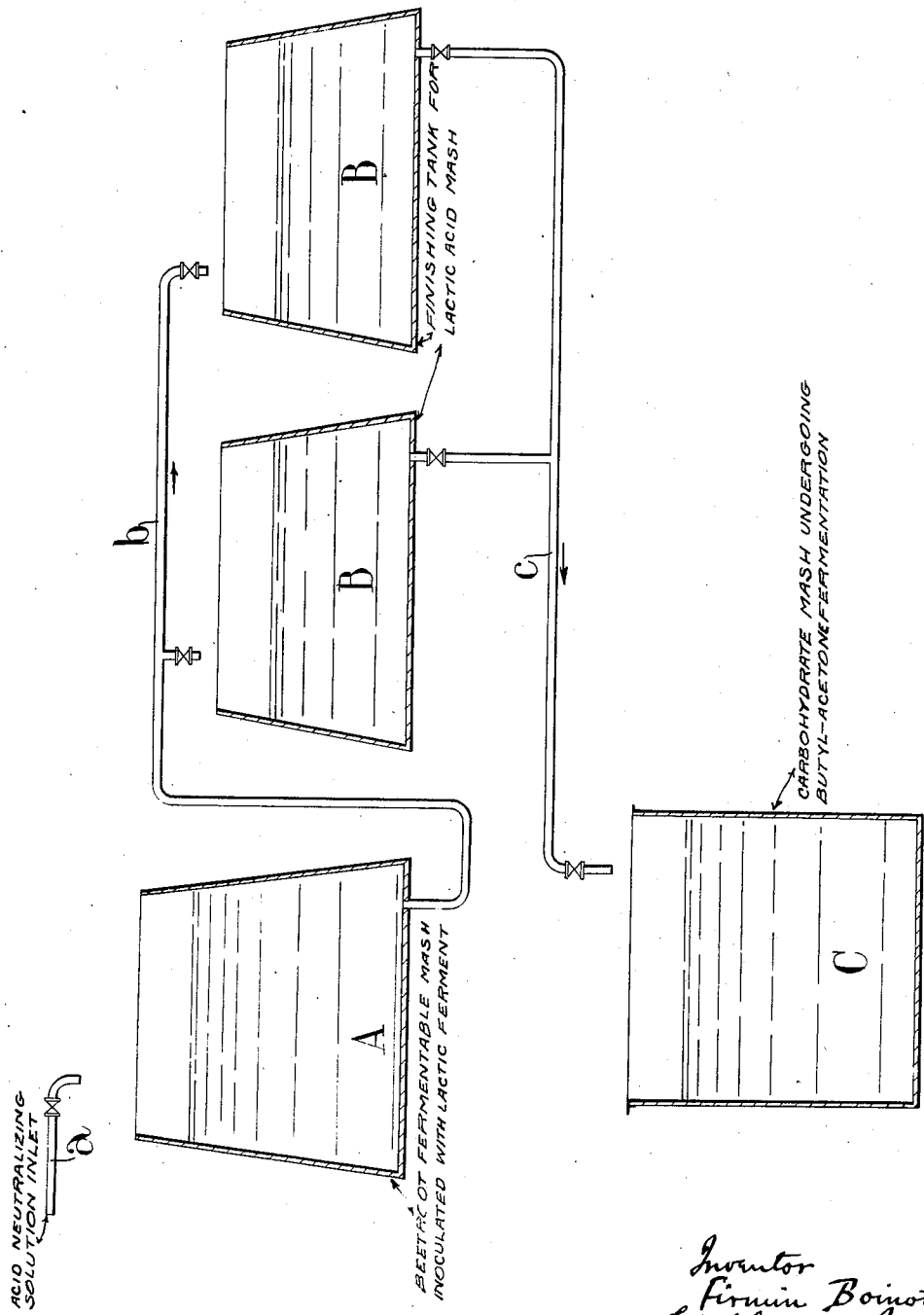

1,565,543

UNITED STATES PATENT OFFICE.

FIRMIN BOINOT, OF MELLE, FRANCE, ASSIGNOR TO COMMERCIAL SOLVENTS CORPORATION, OF BALTIMORE, MARYLAND.

MANUFACTURE OF NORMAL BUTYL ALCOHOL.

Application filed April 14, 1924. Serial No. 706,310.

*To all whom it may concern:*

Be it known that I, FIRMIN BOINOT, a citizen of the French Republic, and residing at Distilleries des Deux-Sevres, Melle, Deux-Sevres, France, have invented certain new and useful Improvements Relating to the Manufacture of Normal Butyl Alcohol, of which the following is a specification.

This invention relates to the manufacture of normal butyl alcohol by bacteriological fermentation. It is known that when carbohydrates are submitted to a butyl-acetone fermentation by means of bacteria of the butyric type, they are split up and give rise to gaseous products which are principally carbon dioxide and hydrogen, and to liquid products consisting mainly of normal butyl alcohol and acetone. These two last-named bodies in a normal fermentation always occur in proportions which are substantially constant, and in the neighbourhood of two parts of butyl alchohol to one part of acetone.

The present inventor has endeavoured to modify the proportions of the liquid bodies obtained in such fermentation. He has found that when lactates of an alkali or alkaline earth metal, e. g., sodium and calcium are added to the carbohydrate mash, either before or during the course of fermentation, the salts so added give rise to the formation of butyl alcohol without any appreciable production of acetone. This fact therefore furnishes a simple and practical means of increasing the proportion of butyl alcohol during industrial manufacture.

The invention consists in combining carbohydrate mashes undergoing butyl-acetone fermentation with lactates or lactate mashes, so that in the final product the proportion of butyl alcohol to acetone is increased.

The part of the mash which consists of carbohydrates gives rise to butyl alcohol and acetone, while the part which consists of lactates gives rise to the production of butyl alcohol. For this purpose lactates can be employed as follows:—

(1) In the state of lactic mashes, obtained by the fermentation of carbohydrates by lactic ferments.

(2) In the state of solid salts, particularly those of sodium and calcium obtained by any suitable process.

(3) In the state of solutions of such salts.

In carrying out this invention in one form by way of example, and referring to the accompanying drawing, representing a suitable arrangement of apparatus, a lactate containing mash is prepared as follows:—
In a vat A there are placed 1,000 litres of beetroot juice, which is then raised to the boiling point and cooled off by ordinary means to 40° C. This juice is inoculated with a culture of a lactic ferment. Any lactic ferment may be used for this purpose, but preferably a ferment is chosen which has the property of fermenting energetically in a very acid medium, e. g., a very active culture of *Bacillus Bulgaricus* may be used after isolation from the micro-organims usually found in yoghourt (Bulgarian clotted milk) or leben, Egyptian clotted milk) the isolation being carried out in accordance with known bacteriological practice. The acidity is allowed to grow with the fermentation up to 20 grs. per litre expressed as lactic acid. When this point is reached, beetroot juice, either sterilized or non-sterilized, and containing 80 to 199 grs. of sugar per litre, is introduced into the mash from the pipe *a*. This juice has previously been subjected to an addition of sodium or calcium carbonate in the amount required to prevent the acidity in the vat A from rising above 20 grs. per litre. The fermenting mash in vat A is constantly carried away through the pipe *b*, and through it 300 litres of mash are successively charged into the finishing tanks B in twenty-four hours. The fermentation is completed in these tanks.

The next step, after the fermentation is completed, is to neutralize the acidity completely with sodium or calcium carbonate. The mash is next heated to 80° C. in order to destroy the lactic ferments, and an addition is made of from 300 to 400 litres of ordinary cold water to bring the temperature back to a suitable degree, and at the same time in order to have a mash which will contain about 4% of lactates, which is found to be the best concentration for use as described below. In this way, therefore, from 600 to 700 litres of lactic acid mash are produced every twenty-four hours.

The conversion of the lactate in one example is carried out as follows:—

In a vat C is a carbohydrate mash which has been brought into butyl-acetone fermentation by known methods. To 1,000 litres of this mash are added 1,000 litres of lactate mash obtained as described above, the addition taking place through a pipe c, and at the rate of 500 litres in twenty-four hours. This addition is commenced when the butyl-acetone fermentation of the carbohydrates has been effected to the extent of about 30 per cent. The lactate is transformed into butyl alcohol under the influence of the butyl-acetone fermentation in this vat. The respective quantities of liquid products of fermentation so obtained are about 16% of acetone and 84% of butyl alcohol.

This example is not to be considered as limiting the scope of the invention, and is given by way of indicating the general nature of the operations.

Having now described my invention what I claim as new and desire to secure by Letters Patent is:—

1. A process for the production of butyl alcohol, consisting in bringing together carbohydrate mashes undergoing butyl-acetone fermentation, and a lactic mash, so that the ratio of butyl alcohol to acetone in the resulting mash is increased.

2. Process for producing butyl alcohol from lactic acid compounds consisting in bringing such compounds gradually under the influence of a carbohydrate mash in active butyl-acetone fermentation.

3. A process for producing butyl alsohol which comprising adding a lactate to a carbohydrate mash undergoing butyl-acetone fermentation whereby the ratio of butyl alcohol to acetone in the resulting mash is increased.

4. In the process for producing butyl alcohol from a fermentable carbohydrate mash the step which consists in adding a lactate to said mash.

5. In the process for producing butyl alcohol from an inoculated fermentable carbohydrate mash the step which consists in adding a lactate to said mash after the fermentation has commenced.

In testimony whereof I have signed my name to this specification.

FIRMIN BOINOT. [L. S.]